United States Patent Office 3,849,449
Patented Nov. 19, 1974

3,849,449
FURO[3,2-d][1,2,3]DIAZABORINES
Gareth Morse Davies, Macclesfield, England, assignor to Imperial Chemical Industries Limited, London, England
No Drawing. Filed Sept. 14, 1972, Ser. No. 289,114
Claims priority, application Great Britain, Oct. 4, 1971, 46,047/71; July 6, 1972, 31,691/72
Int. Cl. C07d 5/16, 107/02; C07f 5/02
U.S. Cl. 260—347.2                    7 Claims

ABSTRACT OF THE DISCLOSURE

Furo[1,2,3]diazaborine derivatives, for example 1,2-dihydro - 1 - hydroxy - 2 - (toluene-4-sulphonyl)furo[3,2-d][1,2,3]-diazaborine and precursors thereof, for example 2 - benzenesulphonylhydrazonomethyl)furan 3 - boronic acid, which possess useful antibacterial properties, processes for their manufacture, and pharmaceutical and veterinary compositions containing them.

---

This invention relates to new heterocyclic compounds, and in particular it relates to new boron derivatives which possess valuable antibacterial properties.

According to the invention there is provided a boron derivative of the formula:

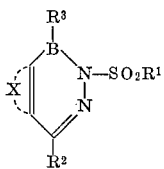

wherein X is a vinyleneoxy (—O.CH=CH— or

—CH=CH.O—)

radical, optionally bearing as substituent on the carbon atom adjacent to oxygen, a halogen atom or an alkyl, alkenyl, alkoxy, alkylthio or aralkyl radical of 1 to 8 carbon atoms, $R^1$ is an alkyl radical of 1 to 6 carbon atoms, an aryl or aralkyl radical of up to 10 carbon atoms, which is unsubstituted or which bears 1 to 3 substituents selected from halogen atoms, amino and nitro radicals, and alkyl, alkoxy, alkythio and alkanoylamino radicals of 1 to 3 carbon atoms, or is a heterocyclic radical optionally substituted by a halogen atom, or by an alkyl, alkoxy or alkylthio radical of 1 to 3 carbon atoms, and $R^2$ and $R^3$, which may be the same or different, are each a hydrogen atom, a hydroxy radical, an alkoxy radical of 1 to 4 carbon atoms, an alkyl radical of 1 to 10 carbon atoms, an aryl radical of up to 10 carbon atoms optionally substituted as defined above, or a heterocyclic radical optionally substituted as defined above, or $R^3$ is a heterocyclic-oxy radical, wherein the heterocyclic radical is optionally substituted as defined above.

A suitable halogen atom substituent in X is, for example, a chlorine, bromine, iodine or fluorine atom, and suitable alkyl, alkenyl, alkoxy, alkylthio or aralkyl substituents in X are, for example, methyl, propyl, hexyl, alyl, methoxy, ethoxy, methylthio or benzyl radicals. A preferred substituent is the methyl radical.

A suitable value for $R^1$ when it is an alkyl radical of 1 to 6 carbon atoms is, for example the methyl, ethyl or isopropyl radical, particularly the methyl radical.

A suitable value for $R^1$, $R^2$ or $R^3$ when it is an aryl radical is, for example, a phenyl or naphthyl radical and a suitable value of $R^1$ when it is an aralkyl radical is, for example, the benzyl radical.

A suitable value for a halogen substituent in $R^1$ when it is a substituted aryl or aralkyl radical or in $R^2$ or $R^3$ when it is an aryl radical is, for example, a chlorine, bromine, iodine or fluorine atom. Thus, particular values are an aminophenyl, nitrophenyl, chlorophenyl, bromophenyl, iodophenyl, fluorophenyl or chloronaphthyl radical, for example the 4-nitrophenyl, 4-chlorophenyl, 3,4-dichlorophenyl or 4-chloronaphthyl radical.

A suitable value for an alkyl, alkoxy, alkylthio or alkanoylamino substituent in $R^1$ when it is an aryl or aralkyl radical is, for example, a methyl, propyl, methoxy, ethoxy, methylthio or acetamido radical. Thus, a particular value for $R^1$ is a tolyl, methoxyphenyl or acetamidophenyl, for example the 4-tolyl, 4-methoxyphenyl or 4-acetamidophenyl.

A particular value for $R^1$ when it is an aryl or aralkyl radical bearing more than one type of substituent is, for example, a nitrochlorophenyl or methoxychlorophenyl radical, for example the 4-chloro-3-nitrophenyl or 4-chloro-2,5-dimethoxyphenyl radical.

A suitable value for $R^2$ or $R^3$ when it is an alkoxy radical is, for example, the methoxy or butoxy radical, a suitable value when it is an alkyl radical is, for example, the methyl radical, and a suitable value when it is an aryl radical is, for exmple, the phenyl radical.

A suitable heterocyclic radical is, for example, a monocyclic or bicyclic radical containing one or two hetero atoms, selected from oxygen, sulphur and nitrogen, in one ring, for example a thienyl, furyl, pyridyl, pyrimidinyl, morpholino, benzthienyl, benzfuryl or quinolyl radical. A preferred value for $R^1$ when it is a heterocyclic radical is a thienyl, for example the 2-thienyl, or morpholino radical. Suitable halogen atom substituents in such a heterocyclic radical are chlorine, bromine and iodine atoms, and suitable alkyl, alkoxy and alkylthio substituents are, for example, methyl, ethoxy and methylthio radicals.

A suitable value for $R^3$ when it is a heterocyclic-oxy radical is a quinolyloxy radical, for example the 8-quinolyloxy radical.

A preferred group of boron derivatives of the invention comprises those compounds which are furo[3,2-d][1,2,3]diazaborine derivatives.

Furodiazaborine derivatives of the invention which are preferred, because of their high antibacterial activity, include 2-benzenesulphonyl-1,2-dihydro-1-hydroxyfuro[3,2-d][1,2,3]diazaborine,
1,2-dihydro-1-hydroxy-2-(toluene-4-sulphonyl)furo[3,2-d][1,2,3]diazaborine,
1,2-dihydro-1-hydroxy-2-(4-methoxybenzenesulphonyl)furo[3,2-d][1,2,3]diazaborine,
2-(4-chlorobenzenesulphonyl)-1,2-dihydro-1-hydroxyfuro-[3,2-d][1,2,3]diazaborine,
2-(3,4-dichlorobenzenesulphonyl)-1,2-dihydro-1-hydroxyfuro[3,2-d][1,2,3]diazaborine,
1,2-dihydro-1-hydroxy-2-(4-nitrobenzenesulphonyl)furo[3,2-d][1,2,3]diazaborine,
1,2-dihydro-1-hydroxy-4-methyl-2-(toluene-4-sulphonyl)furo[3,2-d][1,2,3]diazaborine,
1,2-dihydro-1-(quinol-8-yloxy)-2-(toluene-4-sulphonyl)furo[3,2-d][1,2,3]diazaborine,
1,2-dihydro-1-hydroxy-6-methyl-2-(toluene-4-sulphonyl)furo[3,2-d][1,2,3]diazaborine, and
1,2-dihydro-1-hydroxy-2-(thiophen-2-sulphonyl)furo[3,2-d][1,2,3]diazaborine.

According to a further feature of the invention there is provided a process for the manufacture of a furodiazaborine derivative of the invention which comprises:

(a) For those compounds wherein $R^3$ is hydroxy or alkoxy, the reaction of a furylboronic acid derivative of the formula:

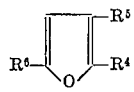
II wherein one of $R^4$ and $R^5$ is a radical of the formula $-COR^2$, wherein $R^2$ has the meaning stated above, and the other is a radical of the formula $-B(R^3)_2$ wherein $R^3$ has the meaning stated immediately above, and $R^6$ is a hydrogen or halogen atom, or an alkyl, alkenyl, alkoxy, alkylthio or aralkyl radical of 1 to 8 carbon atoms, with a sulphonohydrazide of the formula $R^1SO_2.NH\cdot NH_2$, in the presence of an acid; or (b) For those compounds wherein $R^3$ is hydroxy or alkoxy, the cyclisation of a furfurylidenehydrazine derivative of the formula:

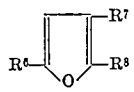
III wherein $R^6$ has the meaning stated above, one of $R^7$ and $R^8$ is a radical of the formula $-CR^2{:}N.NHSO_2R^1$ wherein $R^1$ and $R^2$ have the meanings stated above, and the other is a radical of the formula $-B(R^3)_2$, wherein $R^3$ has the meaning stated immediately above, in the presence of an acid; or (c) The reaction of a furodiazaborine of the formula:

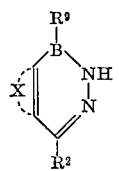
IV or an alkali metal salt thereof, with an acylating agent derived from a sulphonic acid of the formula $R^1SO_2.OH$, wherein $R^1$, $R^2$ and X have the meanings stated above, and $R^9$ has any of the meanings given above for $R^3$ other than hydroxy; or (d) For those compounds wherein $R^3$ is alkoxy or heterocyclic-oxy, the reaction of a furylboronic acid of the formula:

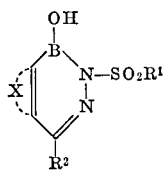
V with an alcohol or heterocyclic alcohol of the formula $R^3H$, wherein $R^1$, $R^2$ and X have the meanings stated above, and $R^3$ is an alkoxy or heterocyclic-oxy radical as defined above.

It is to be understood that, in process (a), the acid may be added as such to the reaction mixture, a suitable acid being, for example, a sulphonic acid, for example toluene-p-sulphonic acid, or the acid may be generated *in situ*. For example, in the initial condensation of the sulphonohydrazide with the furan aldehyde or ketone, a mole of water is eliminated, so that the acid necessary for the overall reaction may be generated *in situ* from an acid anhydride, for example acetic anhydride. Alternatively, if the sulphonohydrazide is added to the reaction in the form of a salt, for example the hydrochloride, the necessary acid may be generated *in situ* by the addition of a salt of a weak acid, for example sodium acetate, thereby producing acetic acid by double decomposition between sodium acetate and the sulphonohydrazide hydrochloride.

A suitable acylating agent derived from a sulphonic acid of the formula $R^1SO_2.OH$ is, for example, the acid chloride, that is to say a sulphonyl chloride, or sulphonyl anhydride, for example toluene-p-sulphonic anhydride.

The reaction may be carried out in a diluent or solvent, for example a hydrocarbon solvent such as benzene, toluene or, for processes (a), (b) or (d) ethanol, or a mixture thereof with benzene or toluene, and at ambient or an elevated temperature, for example at the boiling point of the solvent used.

The furylboronic acid of the formula II used as starting material in the process of the invention may be obtained from a bromofuran by Friedel-Crafts acylation, catalysed by perchloric acid, to give a furan derivative bearing substituents Br and $-COR^2$ on carbon atoms 2 and 3 (not necessarily respectively). The radical $-COR^2$ is converted to an acetal or ketal, for example to the 1,3-dioxolan by reaction with ethylene glycol, which is treated with butyl-lithium followed by tri-isobutylborate, to give a compound of the formula III wherein $R^3$ is alkoxy, whereafter if desired, the product thus obtained is hydrolysed to give a compound of the formula III wherein $R^3$ is hydroxy.

Alternatively, 3-bromofuran may be treated with lithium di-isopropylamide to give 2-lithio-3-bromofuran, which is reacted with a nitrile of the formula $R^2.CN$ and worked up under acid conditions to give a furan derivative bearing substituents Br and $-COR^2$ on carbon atoms 2 and 3, as described above.

Furylboronic acids of the formula II wherein $R^6$ is a halogen atom or an alkyl, alkoxy or alkylthio radical may be obtained by converting the above-mentioned furan derivative bearing substituents Br and $-COR^2$ on carbon atoms 2 and 3, to an acetal or ketal, for example to the 1,3-dioxolan using ethylene glycol, and reacting the dioxolan with lithium diisopropylamide, which gives exclusively lithiation at carbon atom 5 of the furan ring. The lithium derivative thus obtained is then reacted as required with, for example, a halogen or an alkyl, alkenyl or aralkyl halide, an alkyl peroxycarboxylate, for example t-butyl peroxybenzoate, or with sulphur followed by an alkyl iodide, to give a furan derivative bearing substituents Br and 1,3-dioxolan-2-yl on carbon atoms 2 and 3, and a substituent $R^6$ as defined immediately above on carbon atom 5, which derivative is converted to the required furylboronic acid of the formula II in the same way as described above for the unsubstituted compound.

The furodiazaborine of the formula IV which is used as starting material in the process of the invention is obtained by reacting a furylboronic acid of the formula II, ($R^3$=OH), with hydrazine or a salt thereof.

Novel furfurylidenehydrazine derivatives of the formula III which are used as starting materials in the process of the invention also possess useful antibacterial properties, and accordingly such compounds are provided as a further feature of the invention.

A particular group of furfurylidenehydrazine derivatives of the invention of the formula III comprises those compounds wherein $R^1$ is an alkyl radical of 1 to 6 carbon atoms, for example the methyl radical, or phenyl radical which is unsubstituted or which bears one or two substituents selected from halogen atoms, for example chlorine atoms, nitro or amino radicals, or alkyl or alkoxy radicals of 1 to 3 carbon atoms, for example methyl or methoxy radicals. Thus, particular values of $R^1$ are the methyl, phenyl, 4-tolyl, 4-methoxyphenyl, 4-aminophenyl and 4-chloro-3-nitrophenyl radicals.

Preferred furfurylidenehydrazine derivatives of the invention are:

2-(benzenesulphonylhydrazonomethyl)furan 3-boronic acid,
2-(toluene-4-sulphonylhydrazonomethyl)furan 3-boronic acid,
3-(toluene-4-sulphonylhydrazonomethyl)furan 2-boronic acid,
2-(4-methoxybenzenesulphonylhydrazonomethyl)furan 3-boronic acid,
2-(4-aminobenzenesulphonylhydrazonomethyl)furan 3-boronic acid,
2-(4-chloro-3-nitrobenzenesulphonylhydrazonomethyl) furan 3-boronic acid, and
2-(methanesulphonylhydrazonomethyl)furan 3-boronic acid.

According to a further feature of the invention there is provided a process for the manufacture of the furfurylidenehydrazine of the formula III which comprises the reaction of a furylboronic acid of the formula II with a sulphonohydrazide of the formula $R^1SO_2.NH.NH_2$, wherein $R^1$ has the meaning stated above.

The process may be carried out in a solvent, preferably a hydroxylic solvent, for example aqueous ethanol, but it may also be carried out in a hydrocarbon solvent in the presence of an acid, for example in benzene in the presence of toluene-p-sulphonic acid, for a period insufficient to allow the furfurylhydrazine of the formula III to cyclise to a furodiazaborine of the formula I. The reaction should thus be terminated after only a short reaction time.

As stated above, the novel boron derivatives of the invention possess valuable antibacterial and antifungal properties. *In vitro* activity is demonstrated by standard serial-dilution assay against a wide range of bacteria, particularly Gram-negative bacteria, for example *Salmonella dublin* and *Escherischia coli* and against fungi, for example *Candida albicans*; and *in vivo* activity is demonstrated by increased survival time of mice dosed with the compounds, as compared with mice not so dosed, on being infected with *Salmonella dublin*. The preferred boron compounds of the invention are relatively non-toxic, and in infections of, for example *E. coli, Proteus mirabilis, Klebsiella* sp. or *Salmonella dublin* in mice, they exhibit a "therapeutic ratio" between the toxic dose and the therapeutic dose of at least 20. The preferred boron compounds of the invention are at least as active as chloramphenicol against a range of bacteria, and when used to treat bacterial infections in warm-blooded hosts are used in the same way as this well-known antibacterial drug. That is to say, when a boron derivative of the invention is to be used in man, the usual dose is from 10 mg. to 3 g. orally or parenterally daily, normally in divided doses two or three times a day, or topically as required.

Thus according to a further feature of the invention there is provided a pharmaceutical or veterinary composition comprising a boron derivative of the invention and a pharmaceutically- or veterinarily-acceptable diluent or carrier.

Preferred compositions are tablets or capsules, each containing 50, 100 or 250 mg. of the active ingredient, for oral use, sterile injectable solutions or suspensions containing from 0.5 to 5.0% of the active ingredient for parenteral use, and ointments, creams and solutions containing from 0.5 to 5.0% of the active ingredient for topical use.

The pharmaceutical and veterinary compositions may contain conventional excipients and may be obtained by the application of conventional techniques.

The invention is illustrated, but not limited by the following Examples:

EXAMPLE 1

2-Formylfuran 3-boronic acid (280 mg.), benzenesulphonohydrazide (340 mg.), toluene-p-sulphonic acid (20 mg.) and benzene (30 ml.) were heated under reflux for 4 hours in a flask fitted with a Dean and Stark separator. The solution was washed twice with brine, dried, treated with carbon and filtered. The filtrate was evaporated, and the residue was crystallised from isopropanol to give 2-benzene sulphonyl - 1,2 - dihydro-2-hydroxyfuro[3,2-d][1,2,3]diazaborine, m.p. 157–159° C.

EXAMPLE 2

2-Formylfuran 3-boronic acid (840 mg.), benzenesulphonohydrazide (1.1 g.), toluene-p-sulphonic acid (200 mg.) and benzene (70 ml.) were heated under reflux for 2 hours in a flask fitted with a Dean and Stark separator. The solution was cooled, washed with brine until the washings were neutral, and treated with carbon. The solution was dried, the solvent was evaporated and the residue was crystallised from isopropanol to give 2-benzenesulphonyl-1,2-dihydro - 2 - hydroxy-furo[3,2-d][1,2,3]diazaborine as described in Example 1. The mother liquors from the crystallisation were evaporated to dryness, and the residue was triturated with chloroform to give a solid, m.p. 128–133° C. Crystallisation of the solid from a mixture of acetone and petroleum ether (b.p. 40–60° C.) gave 2 - (benzenesulphonylhydrazonomethyl)furan 3-boronic acid, m.p. 137–140° C.

EXAMPLE 3

The process described in Example 1 was repeated using 2-formylfuran 3-boronic acid, and the appropriate sulphonohydrazide in place of benzenesulphonohydrazide, to give the following compounds:

| $R^1$ | M.P. (° C.) | Cyrstallisation solvent |
|---|---|---|
| Methyl | 164–165 | Benzene. |
| 4-tolyl | 180–181 | Do. |
| 4-methoxyphenyl | 178–179 | Do. |
| 3,4-dichlorophenyl | 184–185 | Do. |
| Benzyl | 138–139 | Do. |
| 4-nitrobenzyl | 199–200 | Do. |
| 4-morpholino | 126–127 | Cyclohexane. |

EXAMPLE 4

A mixture of 2-formylfuran 3-boronic acid (0.64 g.), 4-chloronaphthalene-1-sulphonohydrazide (1.17 g.) and acetic anhydride (0.51 g.) in benzene (100 ml.) was heated under reflux in an atmosphere of nitrogen for 20 hours. The resulting solution was filtered, and the filtrate was evaporated under reduced pressure. The residue was dissolved in chloroform (100 ml.) and the solution was washed acid-free with sodium bicarbonate solution (3×15 ml.), washed with saturated brine, and dried. The solvent was evaporated under reduced pressure to give an orange yellow solid, which was washed with ether to remove the colour, and crystallised from benzene, using decolourising carbon to give 2-(4-chloronaphthalene-1-sulphonyl)-1,2-dihydro - 1 - hydroxyfuro[3,2-d][1,2,3]diazaborine, m.p. 214–215° C.

In a similar manner, using the appropriate sulphonohydrazide, the following compounds were obtained:

| $R^1$ | M P (° C) | Crystallisation solvent |
|---|---|---|
| 4-chlorophenyl | 193 | Ethanol |
| 4-chloro-3-nitrophenyl | 188 | Benzene |
| 4-chloro-2,5-dimethoxyphenyl | 221–222 | Do |

In a similar manner, using a mixture of benzene and ethanol as solvent, and 4-acetamidobenzenesulphonohydrazide, there was obtained 2-(4-acetamidobenzenesulphonyl)-1,2-dihydro - 1 - hydroxyfuro[3,2-d][1,2,3diazaborine, m.p. 177–178° C. from methanol.

In a similar manner, using ethanol as solvent, and 4-nitrobenzenesulphonohydrazide, there was obtained 1,2-dihydro - 1 - hydroxy-2-(4-nitrobenzenesulphonyl)furo[3,2-d][1,2,3]diazaborine, m.p. 205–206° C., from ethanol.

EXAMPLE 5

A mixture of 2-formylfuran 3-boronic acid (0.7 g.), thiophen-2-sulphonohydrazide hydrochloride (1.07 g.) and sodium acetate (0.45 g.) in benzene (75 ml.) was heated under reflux in an atmosphere of nitrogen for 3 hours, removing the water formed in the reaction in a Dean and Stark trap. The reaction mixture was filtered, and the filtrate was evaporated to dryness under reduced pressure. The residue was dissolved in benzene, and the solution was washed with saturated brine and dried. The solvent was evaporated under reduced pressure, and the residue was crystallised from a mixture of benzene and petroleum ether (b.p. 60–80° C.), using decolourising carbon, to give 1,2-dihydro-1-hydroxy - 2 - (thiophen-2-sulphonyl) furo[3,2-d][1,2,3]diazaborine, m.p. 154–155° C.

EXAMPLE 6

The process described in Example 1 was repeated, using toluene-p-sulphonohydrazide in place of benzenesulphonohydrazide, and 2-acetylfuran 3-boronic acid and 2-benzoylfuran 3-boronic acid in place of 2-formylfuran 3-boronic acid, to give respectively 1,2-dihydro-1-hydroxy-4-methyl-2-toluene-p-sulphonylfuro[3,2-d][1,2,3]diazaborine, m.p. 135–137° C. from isopropanol, and 1,2-dihydro-1-hydroxy - 4 - phenyl - 2 - toluene-p-sulphonylfuro[3,2-d][1,2,3]diazaborine, m.p. 149–152° C. from isopropanol.

The 2-acetylfuran 3-boronic acid and 2-benzoylfuran 3-borinic acid used as starting materials were obtained by the process exemplified below for the benzoyl compound:

2-Benzoyl-3-bromofuran (8.8 g.), ethylene glycol (3.9 g.) and toluene-p-sulphonic acid (10 mg.) in benzene (50 ml.) were heated under reflux in a Dean-Stark apparatus, in an atmosphere of nitrogen, for 48 hours. The reaction mixture was diluted with ether (30 ml.), washed with brine until acid-free, and dried. The solution was treated with decolourising carbon and evaporated to dryness to give a yellow oil which was a mixture of the ketal and the starting ketone which could not be separated by distillation.

The mixture (11.32 g.) was dissolved in ethanol (30 ml.), and sodium borohydride (1.76 g.) was added in portions to the stirred solution, and the resulting mixture was stirred at room temperature for 1 hour. The solvent was evaporated, and the residue was partitioned between ether and water. The ether layer was separated, washed with water, dried and treated with decolourising carbon, and the solvent was evaporated to give 2-(3-bromo-2-furyl)-2-phenyl-1,3-dioxolan as a pale yellow oil, b.p. 110–113° C./0.1 mm.

A solution of the dioxolan (5 g.) in sodium dry ether (10 ml.) was stirred and cooled to −70° C. under an atmosphere of argon. n-Butyl-lithium (6.6 ml. of a 2.563 M solution in hexane) was added dropwise, and the resulting mixture was stirred at −70° C. for 20 minutes, when a solution of trimethyl borate (2 g.) in ether (5 ml.) was added in one portion to give a viscous mixture. Tetrahydrofuran (5 ml., freshly distilled from lithium aluminium hydride) was added to facilitate stirring, and the solution was stirred at −70° C. for 2 hours before being allowed to warm to room temperature. The solution was cooled to 0° C., and acidified by dropwise addition of 2 N hydrochloric acid in brine. The solution was stirred at 0° C. for 1 hour and extracted with ether, the ether extracts were dried and the solvent was evaporated. The residue was dissolved in acetone (20 ml.), toluene-p-sulphonic acid (300 mg.) was added and the solution was stirred for 3 hours at room temperature. The solvent was evaporated and the residue was dissolved in ethyl acetate and extracted several times with aqueous sodium carbonate solution. The extracts were combined, washed with ethyl acetate, acidified with 5 N hydrochloric acid and extracted with ether. The ether extract was washed acid-free with brine, dried and treated with decolourising carbon, and the solvent was evaporated. The residue was triturated with chloroform, to give 2-benzoylfuran 3-boronic acid.

2-Benzoyl-3-bromofuran was prepared as follows:

A solution of di-isopropylamine (9.52 ml.) in dry tetrahydrofuran (10 ml.) was stirred and cooled to −70° C., and n-butyl-lithium (30.6 ml. of a 2.225 M solution in hexane) was added slowly and the mixture stirred for 20 minutes. A solution of 3-bromofuran (10 g.) in dry tetrahydrofuran (10 ml.) was slowly added dropwise, and the mixture stirred at −70° C. for ¾ hour. A solution of benzonitrile (7 g.) in dry tetrahydrofuran (10 ml.) was added dropwise, and the reaction mixture was stirred at −70° C. overnight. The mixture was allowed to warm to room temperature and ether (100 ml.) was added slowly, followed by 2 N hydrochloric acid in brine until the mixture was acidic. The ether was separated, and the aqueous solution was washed several times with ether. The aqueous solution was heated to 60° C. for 3 hours and extracted with ether, and the ether extracts were washed with brine, dried and treated with decolourising carbon. The solvent was evaporated to give 2-benzoyl-3-bromofuran as a yellow liquid.

EXAMPLE 7

A solution of 8-hydroxyquinoline (0.145 g.) in ethanol (10 ml.) was added to a solution of 1,2-dihydro-1-hydroxy-2-toluene-p-sulphonylfuro[3,2-d][1,2,3]diazaborine (0.29 g.) in ethanol (20 ml.), and the mixture was heated to 70° C. for 5 minutes. The mixture was cooled, and the solid product was filtered off, washed with petroleum ether (b.p. 40–60° C.) and crystallised from chloroform/ethanol to give 1,2-dihydroxy-1-(8-quinolyloxy)-2-toluene-p-sulphonylfuro[3,2-d][1,2,3]diazaborine, m.p. 249–250° C.

EXAMPLE 8

A mixture of 2-formyl-5-methylfuran 3-boronic acid (770 mg.), toluene-p-sulphonohydrazide (1.03 g.), toluene-p-sulphonic acid (10 mg.) in benzene (40 ml.) was heated under reflux in a Dean-Stark apparatus under an atmosphere of nitrogen for 6 hours, and cooled to room temperature. The mixture was filtered, and the filtrate was washed with water until acid-free, dried and treated with decolourising carbon. The solvent was evaporated, and the residue was crystallised twice from acetone to give 1,2-dihydro-1-hydroxy-6-methyl-2-toluene-p-sulphonylfuro[3,2-d][1,2,3]diazaborine, m.p. 180–182° C.

The 2-formyl-5-methylfuran 3-boronic acid used as starting material was obtained by the process described in the second part of Example 6, using 2-(3-bromo-5-methyl-2-furyl)-1,3-dioxolan in place of 2-(3-bromo-2-furyl-2-phenyl-1,3-dioxolan. The 2 - (3-bromo-5-methyl-2-furyl)-1,3-dioxolan was prepared as follows:

A solution of di-isopropylamine (3 g.) in dry tetrahydrofuran (10 ml.) was cooled to −70° C. under an atmosphere of argon, a solution of n-butyl-lithium (12.2 ml. of a 2.2 M solution in hexane) was added dropwise over 5 minutes, and the mixture was stirred at −70° C. for 30 minutes. A solution of 2-(3-bromo-2-furyl)-1,3-dioxolan (6 g.) in dry tetrahydrofuran (15 ml.) was aded, and after 4½ hours, methyl iodide (8.5 ml., freshly distilled from phosphorus pentoxide) was added. The mixture was stirred at −70° C. for 12 hours, allowed to warm to room temperature, and poured onto a mixture of ether and ice. The ether layer was separated, and the aqueous layer was extracted with ether. The combined ether solutions were washed with water, dried and treated with charcoal. Evaporation of the solvent gave a product containing 87% (as indicated by gas-liquid chromatography) of 2-(3-bromo-5-methyl-2-furyl)-1,3-dioxolan, which was used without further purification.

EXAMPLE 9

The process described in Example 2 was repeated, using the appropriate sulphonohydrazide, to give the following compounds:

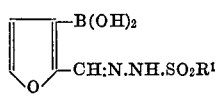

| R¹ | M.P. (° C.) | Crystallisation solvent |
| --- | --- | --- |
| 4-tolyl | 169-170 d.¹ | Acetone/60-80 petrol. |
| 4-aminophenyl | 208-210 d.¹ | Aqueous ethanol. |
| 4-methoxyphenyl | 173-174 d.¹ | Do. |
| 4-chloro-3-nitrophenyl | 167-170 d.¹ | Do. |
| Methyl | 141-142 d.¹ | Methanol. |

¹ d=decomposition

In a similar manner, starting from 3-formylfuran 2-boronic acid, there was obtained 3-(toluene-p-sulphonohydrazonomethyl)furan 2-boronic acid, m.p. 122–124° C. (decomposition) from chloroform/ether.

EXAMPLE 10

Pharmaceutical and veterinary compositions containing a boron derivative may be prepared from any boron derivative of the invention as illustrated in the foregoing Examples by conventional procedures as illustrated below in which the active ingredient is named as 2-benzenesulphonyl - 1,2 - dihydro - 2 - hydroxyfuro[3,2-d][1,2,3]diazaborine, but in which it is to be understood that the amount of this particular active ingredient may be replaced by an equipotent amount of any other illustrated boron derivative of the invention.

Tablet

2-Benzenesulphonyl-1,2-dihydro - 2 - hydroxyfuro[3,2-d][1,2,3]diazaborine is mixed with an inert diluent (lactose or kaolin) and is granulated with a binding agent (gelatine solution, starch paste or acacia mucilage). A disintegrating agent (maize starch, diatomite or alginic acid) is mixed with the granules and a lubricating agent (stearic acid or talc) is added. The mixture is then compressed into tablets which contain 50, 100 or 250 mg. of 2-benzenesulphonyl-1,2-dihydro - 1 - hydroxyfuro[3,2-d][1,2,3]diazaborinate suitable for oral use for therapeutic purposes.

A typical tablet has the following composition:

| | Mg. |
| --- | --- |
| 2-benzenesulphonyl-1,2-dihydro-1-hydroxyfuro-[3,2-d][1,2,3]diazaborine | 250 |
| Lactose | 220 |
| Maize starch | 25 |
| 10% aqueous gelatine solution | 5 |
| Talc | 3 |

Capsules

The following is a typical formulation to provide capsules, suitable for oral use for therapeutic purposes, according to standard pharmaceutical technique:

| | Mg. |
| --- | --- |
| 2-benzenesulphonyl-1,2-dihydro-1-hydroxyfuro-[3,2-d][1,2,3]diazaborine | 250 |
| Lactose | 27 |
| Talc | 3 |

The ingredients are passed through a 60 mesh sieve, and then mixed together for 15 minutes. The mixture is then filled into soft gelatin capsules, so that each contains 280 mg. of the mixture, corresponding to 250 mg. of the active ingredient.

Ointment

A mixture having the composition:

| | Percent by weight |
| --- | --- |
| 2-benzenesulphonyl-1,2-dihydro-1-hydroxyfuro-[3,2-d][1,2,3]diazaborine | 2 |
| Liquid paraffin | 10 |
| Soft white paraffin | 88 | is prepared by adding the active ingredient to a stirred mixture of the paraffins heated at 65° C. The mixture is allowed to cool and the stirring is continued until the mixture is cool. There is thus obtained an ointment suitable for opical application for therapeutic purposes.

Sterile suspension

100 Parts of 2-benzenesulphonyl - 1,2 - dihydro-1-hydroxyfuro[3,2-d][1,2,3]diazaborine are milled to a fine powder, sterilised by conventional techniques, and mixed with 10 parts of sterile, finely-powdered sodium carboxymethylcellulose. The powder is thoroughly mixed together with 50 parts of a sterile, 2% w./v. solution of polyoxyethylenesorbitan mono-oleate in water, and the resulting mixture is then dried. The dry, sterile product is introduced into vials, so that each vial contains 100 mg. of the active ingredient, and the vials are sealed. Addition of 2 ml. of sterile water to such a vial, followed by shaking, produces a sterile 5% suspension of 2-benzenesulphonyl - 1,2 - dihydro - 1 - hydroxyfuro[3,2-d][1,2,3]diazaborine suitable for parenteral administration for therapeutic purposes.

What I claim is:

1. A boron derivative of the formula:

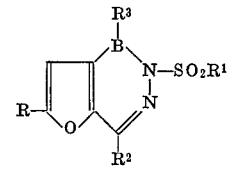

wherein R is hydrogen, methyl or chlorine;
R¹ is methyl, phenyl or phenyl substituted with 1 to 3 substituents selected from the group consisting of halogen, nitro, amino, methyl, methoxy, methylthio and acetamido;
R² is hydrogen, methyl or phenyl; and
R³ is hydroxy.

2. The boron compound of claim 1 wherein
R is methyl;
R¹ is phenyl or substituted phenyl as defined in claim 1;
R² is hydrogen or methyl; and
R³ is hydroxy.

3. The boron derivative of claim 2 wherein R¹ is phenyl, 4-tolyl, 4-methoxyphenyl, 4-chlorophenyl, 3,4-dichlorophenyl or 4-nitrophenyl.

4. The boron derivative of claim 2 wherein R¹ is phenyl or 4-tolyl.

5. The boron derivative of claim 1 which is 1,2-dihydro-1-hydroxy - 2 - (toluene-4-sulphonyl)furo[3,2-d][1,2,3]diazaborine.

6. The boron derivative of claim 1 which is 1,2-dihydro-1-hydroxy-6 - methyl-2-(toluene-4-sulphonyl)furo[3,2-d]-[1,2,3]diazaborine.

7. The boron compound of claim 1 wherein
R is hydrogen or methyl;
R¹ is phenyl or phenyl substituted with 1 to 3 substituents selected from the group consisting of halogen, nitro, amino, methyl, methoxy, methylthio and acetamido;
$R^2$ is hydrogen, methyl or phenyl; and
$R^3$ is hydroxy.

References Cited
UNITED STATES PATENTS

| | | | |
|---|---|---|---|
| 3,714,206 | 1/1973 | Huemer et al. | 260—397.7 |
| 3,455,915 | 7/1969 | Krapcho | 260—243 |
| 3,330,837 | 7/1967 | Bollag et al. | 260—296 |

OTHER REFERENCES

Gronowitz et al., Chem. Abs. 73: 109824e (11–70).
Burger, Medicinal Chemistry (Interscience, New York, 1960), pp. 79–81.

U.S. Cl. X.R.

260—347.8, 340.9, 288 R, 239.6, 247.1 S, 256.4 E. 283 SA, 294.8 C, 330.5, 332.3 H, 346.2 R, 347.5, 347.7, 240 G; 424—229, 248, 251, 258, 263, 275, 285